United States Patent
Tokuhiro

(10) Patent No.: US 6,226,697 B1
(45) Date of Patent: *May 1, 2001

(54) NETWORK SYSTEM WITH SUBSTITUTE CHANNEL ASSIGNMENT INSTEAD OF ALLOTTED DEFAULT CHANNEL FOR TRANSFERRING DATA TO AUTOMATICALLY PREVENT CONFLICTING AMONG PRIMARY NODES

(75) Inventor: Taro Tokuhiro, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,835

(22) Filed: Jun. 11, 1997

(30) Foreign Application Priority Data

Jun. 18, 1996 (JP) ........................................... 8-177279

(51) Int. Cl.⁷ ............................... G06F 3/00; G06F 3/02; G06F 3/05; G06F 3/06
(52) U.S. Cl. ................................. 710/36; 710/37
(58) Field of Search ................... 370/228, 248; 710/36, 37

(56) References Cited

U.S. PATENT DOCUMENTS

| | | | |
|---|---|---|---|
| 4,694,293 | 9/1987 | Sugiyama et al. ............. 340/825.68 |
| 4,817,087 | * 3/1989 | Yamada ................................ 370/85 |
| 5,115,495 | * 5/1992 | Tsuchiya et al. .................... 395/200 |
| 5,226,045 | * 7/1993 | Chuang ................................ 370/95.3 |
| 5,435,003 | * 7/1995 | Chng et al. ........................... 395/575 |
| 5,459,716 | * 10/1995 | Fahim et al. ............................. 370/16 |
| 5,646,936 | * 7/1997 | Shah et al. ............................. 370/228 |
| 5,712,968 | * 1/1998 | Nakayama et al. ............. 395/182.02 |
| 5,781,535 | * 7/1998 | Russ et al. ............................ 370/248 |
| 5,832,197 | * 11/1998 | Houji ............................... 395/182.02 |
| 5,999,994 | * 12/1999 | Wakeland et al. ..................... 710/38 |

FOREIGN PATENT DOCUMENTS

| | | |
|---|---|---|
| 59-72491 | 4/1984 | (JP) . |
| 1-182894 | 7/1989 | (JP) . |

* cited by examiner

*Primary Examiner*—Le Hien Luu
(74) *Attorney, Agent, or Firm*—Morrison & Foerster

(57) ABSTRACT

A data transfer system is constructed for transferring data by routing from primary nodes to secondary nodes through a plurality of channels. In the system, one primary node is comprised of a setup device, a backup device, a routing device and a transmitting device. The setup device automatically tries to secure an exclusive access to a default channel which is initially allotted to said one primary node when the same sets up the routing. The backup device alternatively secures an access to a substitute channel when the setup device fails to secure the exclusive access to the default channel due to conflict with another primary node which is allotted the same default channel. The routing device circulates a message directed to a secondary node to notify thereto the substitute channel secured by the one primary node in place of the default channel, and consequently establishes the routing between the one primary node and the secondary node. The transmitting device routinely transfers data to the secondary node through the substitute channel after the secondary node recognizes that the one primary node secures the substitute channel for communication with the secondary node.

35 Claims, 7 Drawing Sheets

| CH No. | STATE | PROTOCOL | REMARKS |
|---|---|---|---|
| aaa | RECEIVE | MIDI | MIDI DEFAULT CHANNEL |
| bbb | RECEIVE | MIDI | MIDI SUBSTITUTE CHANNEL |
| ccc | SEND | AUDIO | BY MANUAL SETTING |
| ... | ... | ... | ... |

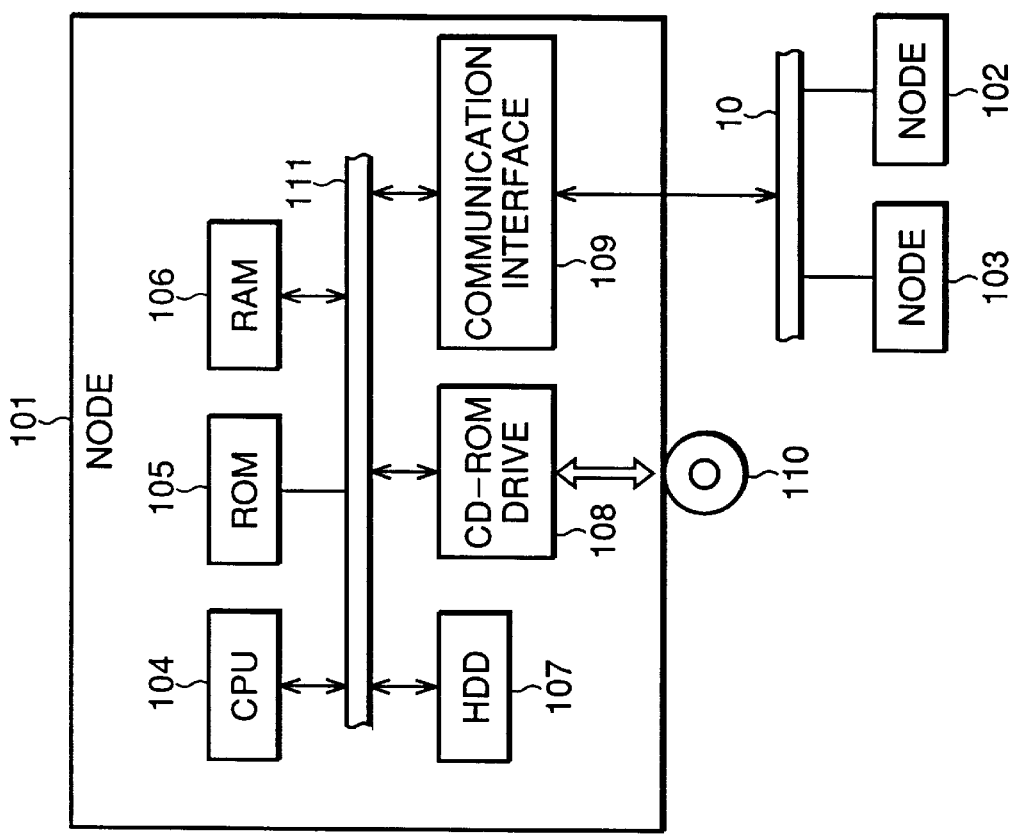

NETWORK SYSTEM WITH SUBSTITUTE CHANNEL ASSIGNMENT INSTEAD OF ALLOTTED DEFAULT CHANNEL FOR TRANSFERRING DATA TO AUTOMATICALLY PREVENT CONFLICTING AMONG PRIMARY NODES

BACKGROUND OF THE INVENTION

1. Field of the Invention

The present invention relates to a data transfer system that transmits data in a plurality of formats via a plurality of channels and, more particularly, to electronic apparatuses constituting nodes of the data transfer system and a channel assignment method for use in the data transfer system.

2. Description of the Related Art

A conventional data transfer system is constituted by electronic apparatuses interconnected by different kinds of cables corresponding to different data formats or protocols. Such a system is referred to as a physically constituted system. Another conventional data transfer system is constituted by electronic apparatuses interconnected by a common cable for transmitting data in a plurality of data formats. Such a system is referred to as a logically constituted system. For example, the latter system can be built up based on a standard known as IEEE1394.

The physically constituted system requires special cables designed for different data formats used in the data communication. The system involves drawbacks such as taking time for physical connection of different cables, creating considerable administration cost, giving clumsiness in external appearance, and causing connection error or confusion.

The logically constituted system can interconnect the participant electronic apparatuses with a single type of the common cable, involving no problem that may otherwise be caused by the presence of many cables of different types. This system also facilitates broadcast or multicast processing in which same data is transmitted to a plurality of destinations.

In the physically constituted system, the different types of cables must be provided for all different data formats used in the data communication as described above, so that the data flow among the participant electronic apparatuses can be visually recognized with respect to each protocol adopted between a pair of source node and a destination node.

On the other hand, in the logically constituted system, the data flow among the participant electronic apparatuses is controlled by software or computer program, making it substantially impossible to visually grasp the data flow or routing. That is, simply interconnecting the participant electronic apparatuses or components with the common cable of a single type cannot in general ensure the desired routing. Thus, although the logically constituted system has many advantages, the difficulty in the visual checking of the routing and connection states may hinder desired operation of the system such as musical tone generation and image reproduction. The conventional system may fail to operate properly when the system is set up by interconnecting components or nodes. The difficulty in the visual checking of the routing also makes it difficult to troubleshoot communication failure, hindering ease-of-use of the data transfer system or network system.

SUMMARY OF THE INVENTION

It is therefore an object of the present invention to provide a logically constituted data transfer system capable of transmitting data in a plurality of data formats via plurality of channels with enhanced operability and ease-of-use of the system.

According to the invention, the data transfer system is constructed for transferring data by routing from primary nodes to secondary nodes through a plurality of channels. In the system, one primary node is comprised of a setup device, a backup device, a routing device and a transmitting device. The setup device automatically tries to secure an exclusive access to a default channel which is initially allotted to said one primary node when the same sets up the routing. The backup device alternatively secures an access to a substitute channel when the setup device fails to secure the exclusive access to the default channel due to conflict with another primary node which is allotted the same default channel. The routing device circulates a message directed to a secondary node to notify thereto the substitute channel secured by said one primary node in place of the default channel, and consequently establishes the routing between said one primary node and the secondary node. The transmitting device routinely transfers data to the secondary node through the substitute channel after the secondary node recognizes that said one primary node secures the substitute channel for communication with the secondary node.

Preferably, the primary nodes are designed to transmit data according to various protocols. Said one primary node and said another primary node incidentally adopt the same protocol and are therefore initially allotted the same default channel corresponding to the same protocol, thereby causing conflict with one another. Further, the primary nodes are designed to transmit audio data according to various protocols including Musical Instrument Digital Interface protocol and Pulse Code Modulation protocol to enable the secondary nodes to synthesize musical tones.

Preferably, the routing device detects when said another primary node succeeds in securing the exclusive access to the default channel, then transmits the message to said another primary node through the default channel, and requests said another primary node to pass the message to the secondary node through the default channel, whereby the secondary node recognizes that said one primary node secures the substitute channel according to the message circulated through the default channel.

Preferably, the secondary node comprises a reset device that resets initial setting of the default channel allotted thereto to the substitute channel according to the circulated message and that is consequently allowed to exclusively admit the data transmitted from said one primary node through the substitute channel.

Preferably, the system further comprises a trimming device that selectively trims by manual operation the routing when the same is automatically established between a single of the primary nodes and a multiple of the secondary nodes so as to customize the routing.

Preferably, the system further comprises a manual device that manually establishes the routing among the secondary nodes in order to avoid an endless looping of the data which would occur if the routing is automatically established among the secondary nodes.

BRIEF DESCRIPTION OF THE DRAWINGS

FIG. 7 is a block diagram showing construction of the node.

DETAILED DESCRIPTION OF THE PREFERRED EMBODIMENT

This invention will be described in further detail by way of example with reference to the accompanying drawings.

Figure 1:
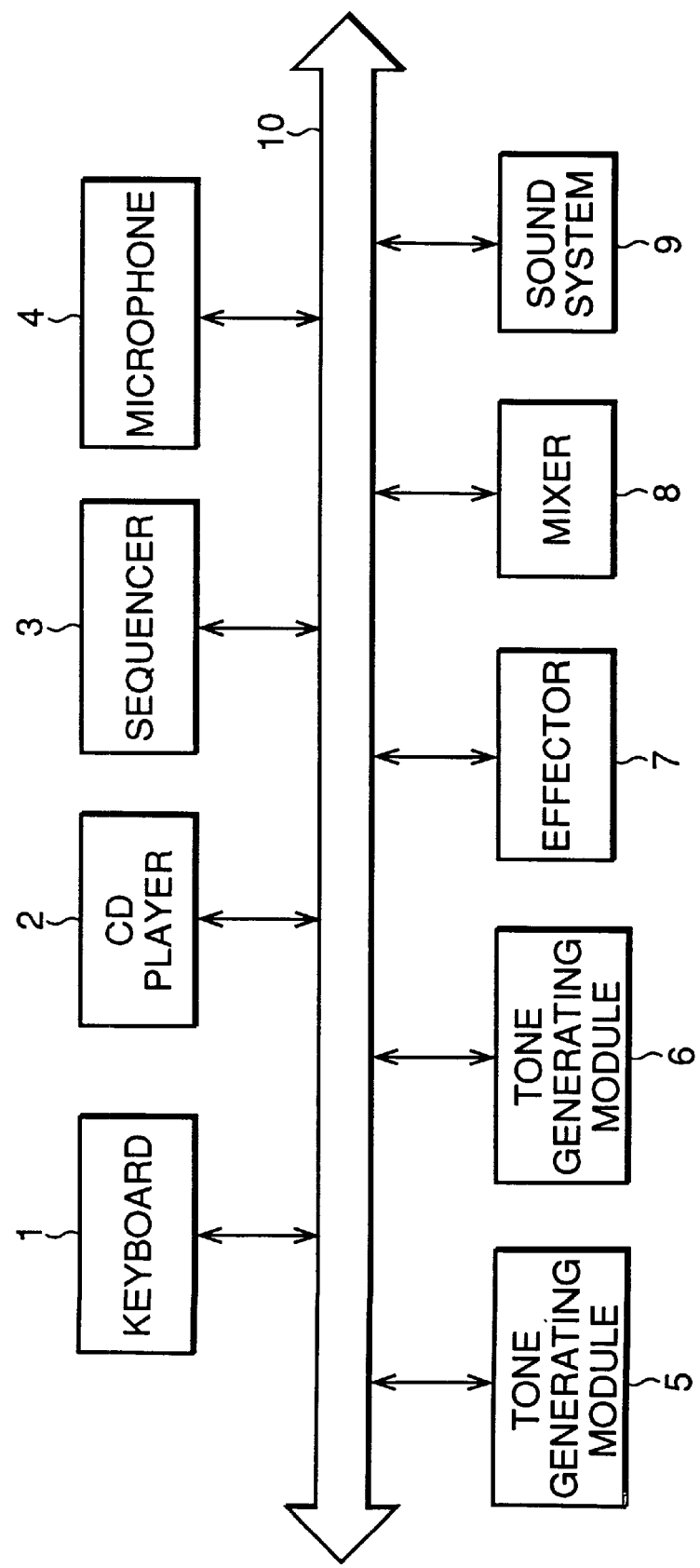
FIG. 1 is a schematic diagram illustrating physical construction of a data transfer system practiced as one preferred embodiment of the present invention.

Now, referring to FIG. 1, there is shown a schematic diagram illustrating physical construction of the data transfer system practiced as one preferred embodiment of the present invention. As shown, the inventive system includes various nodes such as a keyboard 1 provided with keys by which a user performs playing operations and various setting operations for outputting MIDI data according to the performed operations, a CD player 2 provided for reproducing an audio signal from a compact disc (CD) and for outputting the reproduced audio signal, a sequencer 3 provided for retrieving play data from a storage medium such as a floppy disc and for outputting the play data in the form of MIDI data, a microphone 4 provided for converting a voice signal into an electrical signal and for outputting the same as one of the audio signals, a first tone generating module 5 provided for receiving the MIDI data to synthesize an audio signal and for outputting the synthesized audio signal, a second tone generating module 6 having a capability of imparting effects such as reverberation to a received audio signal in addition to the regular tone synthesis capability same as the first tone generating module 5, an effector 7 provided for performing effect processing such as creating reverberation and changing frequency characteristics, a mixer 8 provided for mixing received audio signals and for outputting the mixed signal, and a sound system 9 provided for sounding the received audio signal. These node devices are interconnected via a serial data bus 10.

Figure 2:
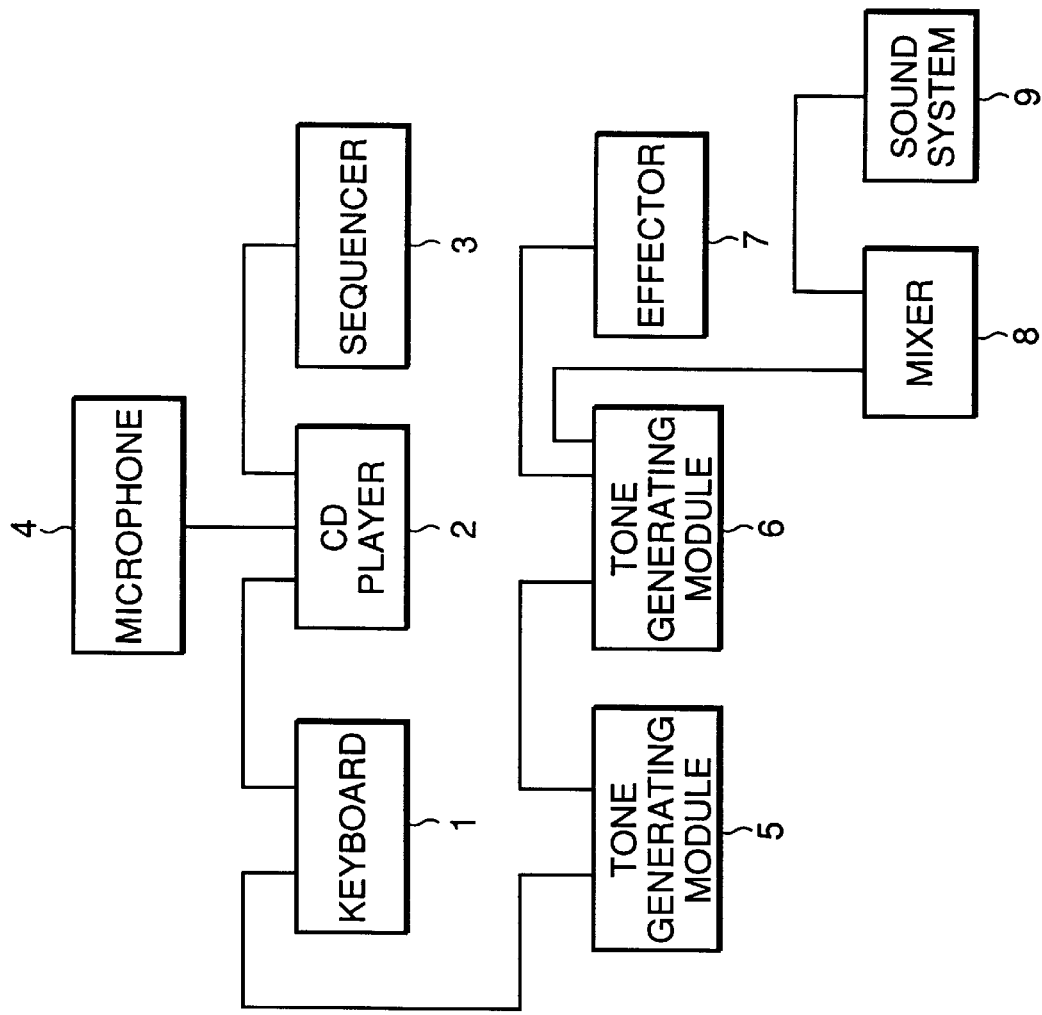
FIG. 2 is a block diagram illustrating physical connection of nodes involved in the data transfer system of FIG. 1.

To be more specific, the above-mentioned node devices or components are interconnected with cables of a common type as shown FIG. 2 by way of example. In the above-mentioned embodiment, this data transfer system is constituted based on the IEEE1394 standard. In this standard, 64 data communication channels (hereinafter, referred to as simply "channels") can be allocated at a maximum delay time of 125 microseconds. Each of the channels is capable of transmitting data having a different data format or protocol. For example, MIDI data has Musical Instrument Digital Interface format. Audio data has Pulse Code Modulation format. Image data has Bit Map format or else.

Each of the above-mentioned node devices is composed of a control section mainly made of a CPU for executing arithmetic and logic operations, a ROM for storing a program to be executed by the CPU and a data table necessary for the execution of the program, and a RAM for use by the CPU as a working area in which data treated by the arithmetic and logic operations is stored, a communication interface for sending and receiving data to and from the bus 10, and an operation panel by which various settings are performed by a user, thereby permitting data transmission between the components via the bus 10.

Figure 3:
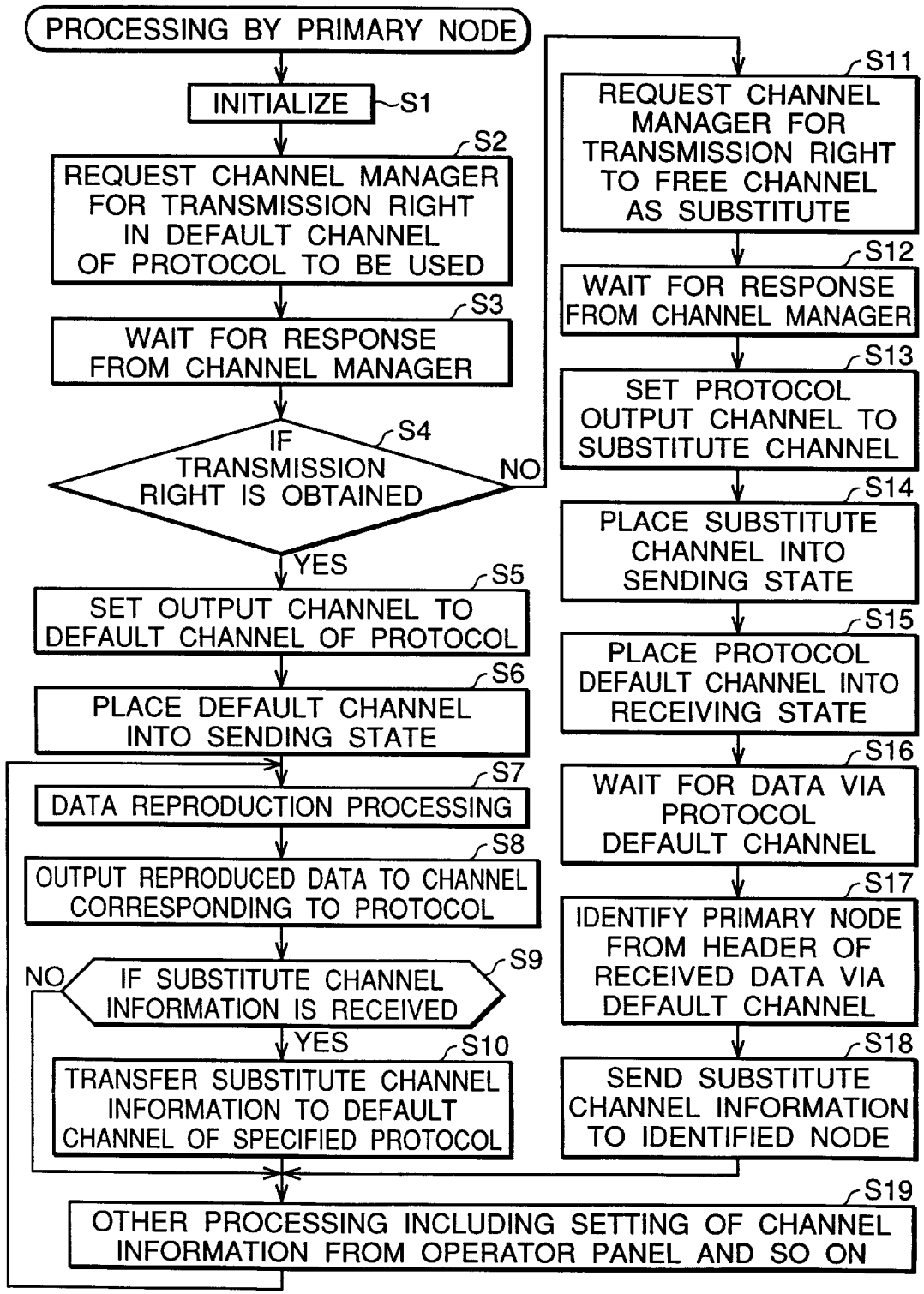
FIG. 3 is a flowchart of data transmission processing performed by primary nodes involved in the system of FIG. 1.
Figure 4:
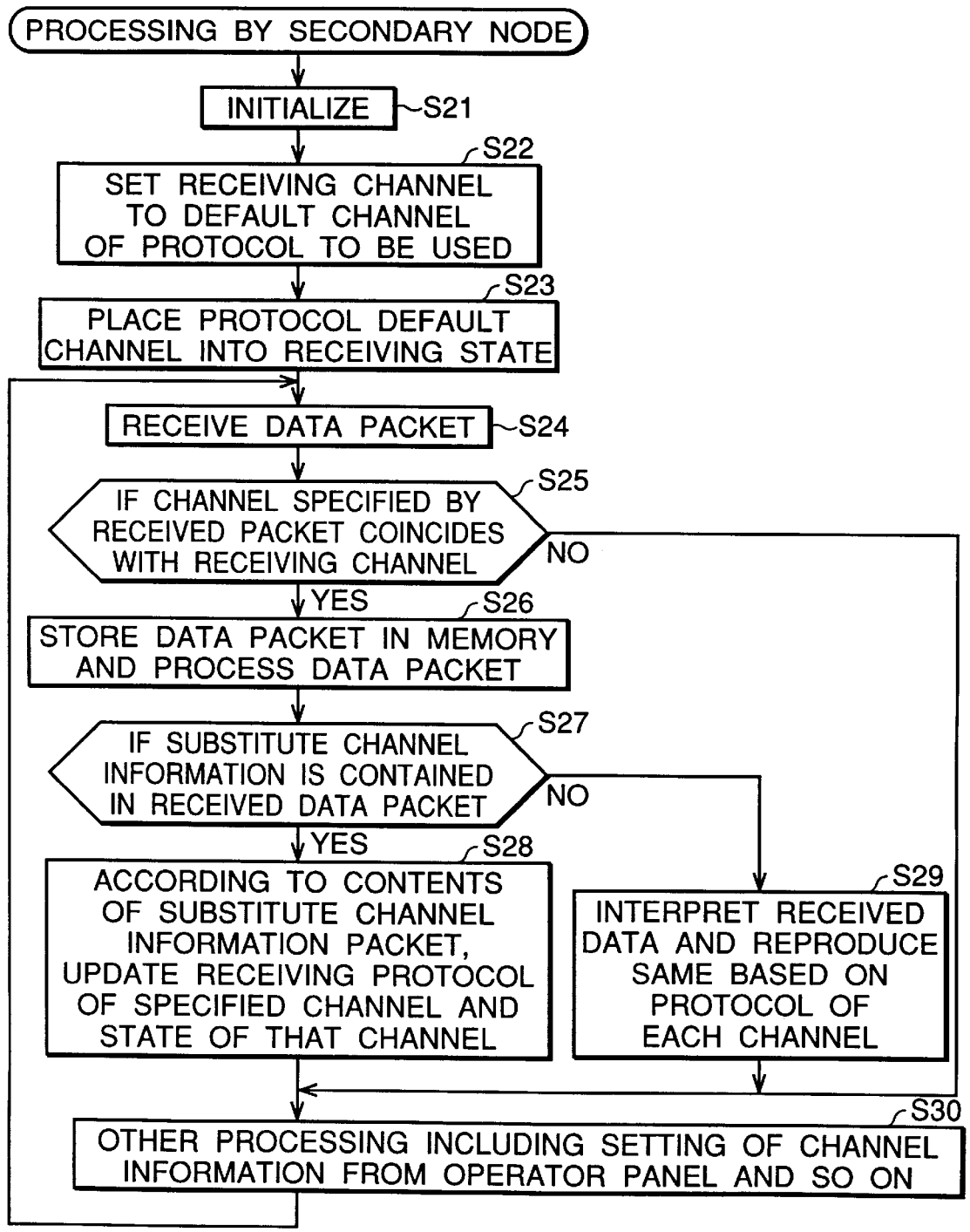
FIG. 4 is a flowchart showing data receipt processing performed by secondary nodes involved in the system of FIG. 1.

FIGS. 3 and 4 are flowcharts illustrating processing executed by the control section of each component after the same has been physically connected to other components. The processing includes routing for allocating a channel to which a specific data format is to be transmitted. It should be noted that, in the present embodiment, the keyboard 1, the CD player 2, the sequencer 3, and the microphone 4 are a primary node, and perform only the primary node processing shown in FIG. 3. The first tone generating module 5, the second tone generating module 6, the effector 7, and the mixer 8 are a secondary node, and perform the secondary node processing shown in FIG. 4. The sound system 9 does not perform the processing of FIGS. 3 and 4.

In step S1 of FIG. 3, initialization is performed by the primary node. To be more specific, various registers and the RAM are cleared, the system configuration or topology according to procedure specified by the IEEE1394 is recognized, and a node number (address on the network system) is acquired. Further, a root node is designated as a channel manager. The role of the channel manager is assumed by one of the nodes constituting the system, for example, keyboard 1. Normally, the role of the channel manager is allocated to a node other than those located at far ends of the network such as the microphone 4 and the effector 7 as shown in FIG. 2.

In step S2, the primary node requests from the channel manager an exclusive transmission right of a default channel initially assigned to a protocol (data format) adopted by the primary node. For example, the primary node composed of the keyboard 1 produces data of MIDI format. The default channel for MIDI data is initially set to the second channel. In such a case, the primary node requests the channel manager for the transmission right of the second channel. Then, the primary node waits for a response from the channel manager (step S3). If the response arrives, the primary node determines whether the transmission right is granted or not (step S4). If the keyboard 1 is incidentally designated as the channel manager, the primary node self-requests the channel manager for the transmission right and obtains the self-response from the internal channel manager.

If the primary node has succeeded in obtaining the exclusive transmission right or priority, the primary node sets an output channel to the default channel for transmission of the data based on the specified protocol. For example, the keyboard 1 secures the second channel (step S5). Namely, the primary node places this default channel in the sending state (step S6). Next, the primary node performs data reproduction processing. For example, the keyboard 1 is scanned and MIDI data corresponding to a depressed key is generated. As for the CD player 2, the CD is accessed to reproduce audio data (step S7). Then, the CD player 2 outputs the reproduced audio data to the channel corresponding to the protocol of the audio data (step S8).

In step S9, the primary node determines whether substitute channel information arrives from another primary node which fails to secure a default channel and adopts a substitute channel. If the substitute channel information is not received, the process goes to step S19. If the substitute channel information is received, the primary node transmits the same to a default channel having the protocol specified by the received substitute channel information (step S10). The substitute channel information is associated with the substitute channel adopted by another primary node in place of the default channel when another primary node could not obtain the transmission right of the default channel due to conflict or else.

Figure 5:
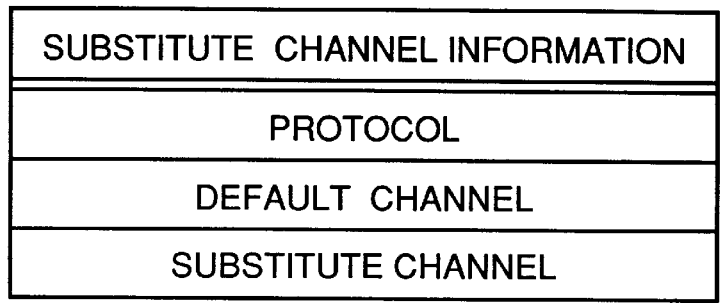
FIGS. 5(a) and 5(b) are table diagrams showing various information and messages exchanged among nodes during the processing shown in the flowcharts of FIGS. 3 and 4.

As shown in FIG. 5(a), the substitute channel information is composed of messages indicating the protocol such as MIDI data format or audio data format, the default channel number such as the second channel for MIDI data or the third channel for audio data, and the substitute channel number adopted in place of the default channel. For example, if the keyboard 1 succeeds in securing the default channel of MIDI data, that is the second channel, while the sequencer 3 fails to secure the default channel but adopts the fifth channel as the substitute channel, the successful keyboard 1 receives the substitute channel information from the failing sequencer 3 and transmits the received substitute channel information to the default channel, that is the second channel. In this example, the primary node composed of the keyboard 1 judges YES in step S4 since the same succeeds in securing the default channel and performs the processing of steps S5 through S10 to pass the substitute channel information from the other primary node composed of the sequencer 3 to secondary nodes.

If the decision in step S4 is NO, or the transmission right of the default channel could not be obtained, the primary node requests from the channel manager the transmission right of a substitute channel which can be selected among free or available channels (step S11). The primary node waits for a response from the channel manager (step S12). This request may be made with specifying the number of a substitute channel which is possibly available or without specifying a substitute channel number. In this example, the primary node composed of the sequencer 3 judges NO in step S4 since the same fails to secure the default channel, and performs subsequent processing of steps S11 through S18 in order to obtain the substitute channel.

When the response comes from the channel manager indicating that the substitute channel is allocated, the primary node sets the substitute channel as an output channel of the protocol to be used for transmission of data (step S13), and places the substitute channel into the sending state (step S14). Then, the primary node temporarily sets the default channel of the same protocol in a receiving state (step S15), and waits for a message via the default channel (step S16). Upon receiving the message, the primary node identifies from the header of the received message a primary node that is using the default channel (step S17), and sends the substitute channel information to that identified primary node (step S18). For example, the keyboard 1 is allocated the default channel of MIDI data (the second channel) while the sequencer 3 is allocated the substitute channel (the fifth channel). In such a case, the sequencer 3 sends the substitute channel information to the keyboard 1 in step S18. Consequently, as described above, by the processing of steps S9 and S10 in the keyboard 1, the substitute channel information is passed to the secondary nodes specifically treatinng MIDI data such as the first tone generating module 5 and the second tone generating module 6 via the default channel of MIDI data (the second channel).

In step S19, the primary node performs other processing and then goes back to step S7 to repeat the processing of steps 7 through 19. In the other processing, the primary node performs channel setting processing under command by the user, which will be described later.

FIG. 4 shows a flowchart describing the processing by a secondary node such as the tone generating modules 5 and 6. At first, in step S21, the same initialization processing as that performed by the primary node in step S1 of FIG. 3 is performed by the secondary node. In step S22, the secondary node provisionally sets a receiving channel to the default channel of the protocol specific to the secondary node. For example, the first tone generating module 5 exclusively receives and processes MIDI data, so that the secondary node composed of the first tone generating module 5 provisionally sets the receiving channel to the default channel (the second channel) of MIDI data. The default channel is identified by channel number aaa in FIG. 5(b). Then, the secondary node places the default channel of the MIDI protocol into a ready state (step S23) to receive a data packet (step S24). In step S25, the secondary node determines whether channel identification attached to the received data packet is registered in the received state or not. If the channel designation is not registered, the process goes directly to step S30. If the channel identification is registered, the secondary node admits the received data packet and stores the same in the RAM (step S26), and determines whether the received data contains substitute channel information or not (step S27).

If the received data packet does not contain the substitute channel information, the secondary node interprets the received data packet based on the protocol corresponding to that channel, and performs the regular processing of the secondary node. For example, the secondary node composed of the first tone generating module 5 synthesizes a musical tone signal from MIDI data. Thereafter, the routine goes to step S30. If the received data packet contains the substitute channel information, the secondary node selects a channel specified by the substitute channel information, and updates the protocol of the selected channel as specified by the substitute channel information and also updates the state of that channel (step S28). Such a channel is specified in terms of a channel number bbb as indicated in the table diagram of FIG. 5(b). Thereafter, the routine goes to step S30. For example, when the tone generating module 5 functioning as the secondary node receives the substitute channel information from the sequencer 3 transferred via the keyboard 1, the tone generating module 5 updates the receiving protocol of a corresponding channel specified by the substitute channel information and the state of that corresponding channel in order to exclusively receive the data from the sequencer 3 by using the substitute channel and the corresponding protocol.

In step S30, the secondary node performs other processing which will be described later, and repeats the processing of steps S24 through S30. It should be noted that, in any node corresponding to a plurality of protocols, the above-mentioned channel allocation processing is performed for each of the plurality of protocols. For example, in the second tone generating module 6, two receiving channels are allocated for MIDI data and audio data, respectively. Also, if an input device such as a keyboard is attached with a microphone, and is included in the system, the sending channels are allocated for MIDI data and audio data, respectively.

Figure 6:
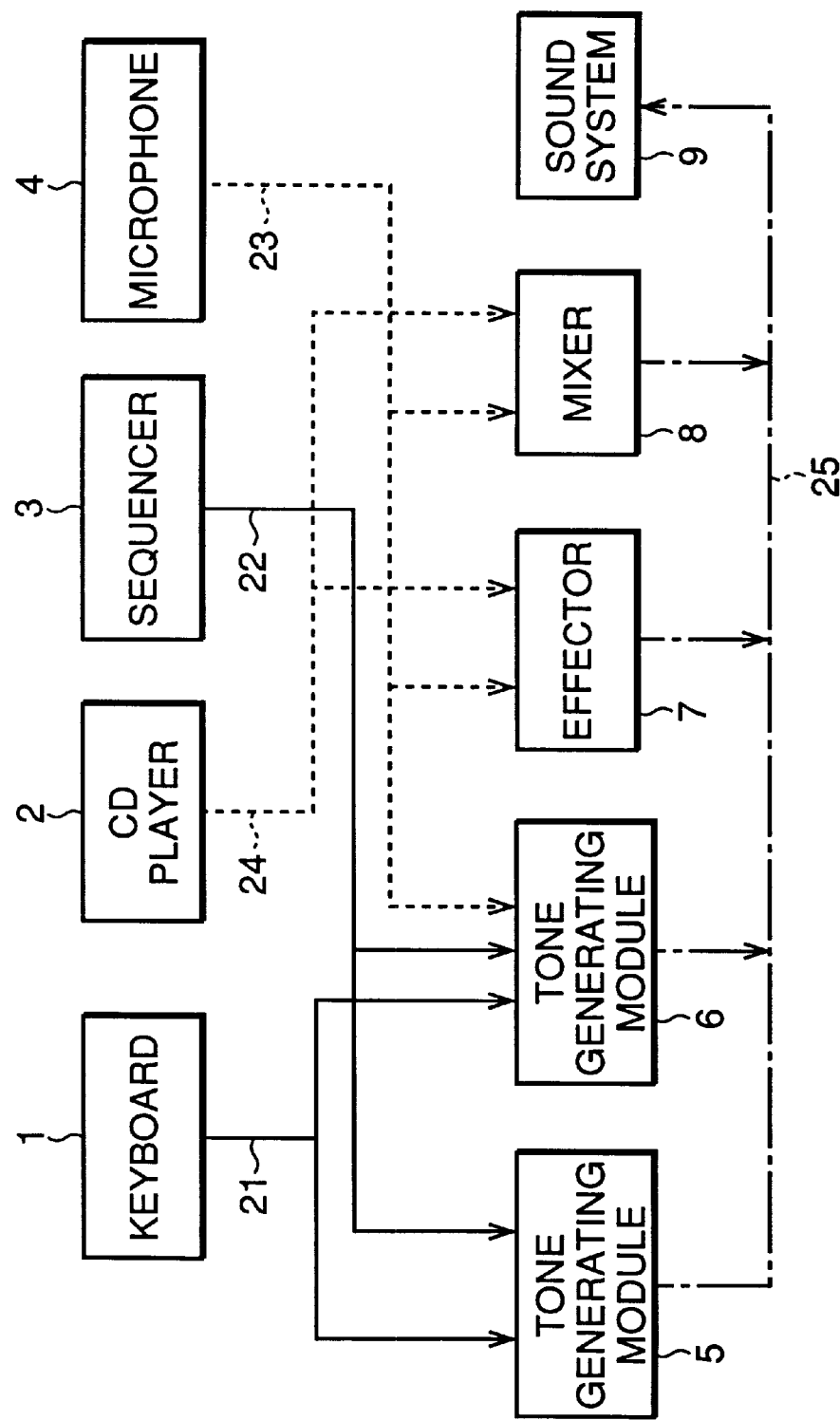
FIG. 6 is a block diagram illustrating logical state of the connection among the nodes established by the processing shown in the flowcharts of FIGS. 3 and 4.

FIG. 6 is a diagram schematically illustrating the logical connection relationship among the nodes which are interconnected to constitute the inventive music system shown in FIG. 1. In FIG. 6, solid lines 21 and 22 and dashed lines 23 and 24 indicate the channels established by the above-mentioned primary node processing and the secondary node processing (except for step S19 of FIG. 3 and step S30 of FIG. 4), and the data flows involved in these processing operations. To be more specific, the channel allocation is made such that the MIDI data of the keyboard 1 and the sequencer 3 is supplied to the first and second tone generating modules 5 and 6, the audio data of the CD player 2 is supplied to the effector 7 and the mixer 8, and the audio data of the microphone 4 is supplied to the second generating module 5, the effector 7, and the mixer 8. The present example shows a case in which the keyboard 1 secures the default channel (for example, the second channel) of MIDI data, the sequencer 3 secures the substitute channel (for example, the fifth channel) of MIDI data, the microphone 4 obtains the default channel (for example, the third channel) of audio data, and the CD player 2 obtains the substitute channel (for example, the sixth channel) of audio data.

A dot-and-dash line 25 of FIG. 6 indicates a channel manually set by the operation panel in step S19 of FIG. 3. In the present embodiment, the secondary nodes such as the first and second tone generating modules 5 and 6, the effector 7, and the mixer 8 do not request for the channel to the sound system 9. In other words, any request for the sending channel is not made with regard to secondary data generated by processing primary data coming from the primary nodes. Therefore, the secondary data channel indicated by the dot-and-dash line 25 is manually set by the user. The secondary data channel is specified by the channel ccc in FIG. 5(b). This is done to prevent a loop from being formed in a case where the output of the effector 7 is fed to the mixer 8 and the output of the mixer 8 is fed back to the effector 7. Consequently, in the construction of FIG. 1, though the first and second tone generating modules 5 and 6, the effector 7, and the mixer 8 can function as both the secondary nodes and primary nodes, these components actually perform only the processing of steps S1, S7, S8 through S19 in the primary node processing shown in FIG. 3.

In the state shown in FIG. 6, the MIDI data transmitted from the keyboard 1 and the sequencer 3 is processed concurrently by the first and second tone generating modules 5 and 6, causing duplicate sounding. Part of the audio data transmitted from the CD player 2 is processed by the effector 7 and the other part passes the mixer 8 without being processed by the effector 7, causing undesired sound. The audio data transmitted from the microphone 4 is processed by the second tone generating module 6, the effector 7, and the mixer 8, causing redundant sound. Therefore, in order to prevent the duplicate and redundant sounding from happening, the user manually disconnects the channel between the keyboard 1 and the second tone generating module 6, disconnects the channel between the sequencer 3 and the first tone generating module 5, and disconnects the channel between the microphone 4 and the effector 7 as well as the second tone generating module 6, by way of example. This processing is performed in step S19 of FIG. 3. Preferably, the logical state of the established routing shown in FIG. 6 is displayed on the monitor of the operation panel installed in one of the nodes.

Thus, in the present embodiment, by physically building up the data transfer system by interconnecting the desired components 1 through 9 via the common data bus 10, the control section of each component operates to automatically secure the proper channels as indicated by the solid lines 21 and 22 as well as the dashed lines 23 and 24 of FIG. 6, thereby facilitating the necessary logical connection to enhance the ease-of-use of the logically constituted system while making the most of the same. Namely, even those who are unfamiliar with the interconnection of the plurality of components can set up a desired data transfer system with ease.

For summary, according to the invention, the data transfer system is constructed for transferring data by routing from primary nodes such as the keyboard 1, the CD player 2, the sequencer 3 and the microphone 4 to secondary nodes such as the first tone generating module 5, the second tone generating module 6, the effector 7 and the mixer 8 through a plurality of channels 21, 22, 23, 24 and so on. In the system, one primary node exemplified by the sequencer 3 is comprised of a setup device, a backup device, a routing device and a transmitting device. The setup device automatically tries to secure an exclusive access to a default channel 21 which is initially allotted to the sequencer 3 when the same sets up the routing. The backup device alternatively secures an access to a substitute channel 22 when the setup device fails to secure the exclusive access to the default channel 21 due to conflict with another primary node exemplified by the keyboard 1 which is allotted the same default channel 21. The routing device circulates a message directed to a secondary node exemplified by the first tone generating module 5 to notify thereto the substitute channel 22 secured by the sequencer 3 in place of the default channel 21, and consequently establishes the routing between the sequencer 3 and the tone generating module 5. The transmitting device routinely transfers data to the tone generating module 5 through the substitute channel 22 after the tone generating module 5 recognizes that the sequencer 3 secures the substitute channel 22 for communication with the tone generating module 5.

Preferably, the primary nodes are designed to transmit data according to various protocols. In such a case, the sequencer 3 and the keyboard 1 incidentally adopt the same MIDI protocol and are therefore initially allotted the same default channel 21 corresponding to the same MIDI protocol, thereby causing conflict with one another. Further, the primary nodes are designed to transmit audio data according to various protocols including Musical Instrument Digital Interface protocol and Pulse Code Modulation protocol to enable the secondary nodes to synthesize musical tones.

Preferably, the routing device of the sequencer 3 detects when the keyboard 1 succeeds in securing the exclusive access to the default channel 21, then transmits the message to the keyboard 1 through the default channel 21, and requests the keyboard 1 to pass the message to the secondary node such as the tone generating module 5 through the default channel 21, whereby the secondary node recognizes that the sequencer 3 secures the substitute channel 22 according to the message circulated through the default channel 21.

Preferably, the secondary node exemplified by the tone generating module 5 comprises a reset device that resets initial setting of the default channel 21 allotted thereto to the substitute channel 22 according to the circulated message and that is consequently allowed to exclusively admit the data transmitted from the sequencer 3 through the substitute channel 22.

Preferably, the system further comprises a trimming device that selectively trims by manual operation the routing when the same is automatically established between a single of the primary nodes such as the sequencer 3 and a multiple of the secondary nodes such as the first and second tone generating modules 5 and 6 so as to customize the routing.

Preferably, the system further comprises a manual device that manually establishes the routing indicated by the channel 25 among the secondary nodes in order to avoid an endless looping of the data which would occur if the routing is automatically established among the secondary nodes including the first tone generating module 5, the second tone generating module 6, the effector 7, and the mixer 8.

FIG. 7 shows construction of a typical node involved in the inventive musical system. The node 101 is connected to other nodes 102 and 103 through a data bus 10 so as to set up the musical system. The node 101 is implemented by a personal computer machine composed of CPU 104, ROM 105, RAM 106, HDD (hard disk drive) 107, CD-ROM drive 108, and communication interface 109. The storage such as ROM 105 and HDD 107 can store various data and various programs including an operating system program and an application program which is executed to produce the music sound. Normally, the ROM 105 or HDD 107 provisionally stores these programs. However, if not, any program may be loaded into the node 101. The loaded program is transmitted to the RAM 106 to enable the CPU 104 to operate the inventive system. By such a manner, new or version-up programs can be readily installed in the system. For this purpose, a machine-readable media such as a CD-ROM (Compact Disc Read Only Memory) 110 is utilized to install the program. The CD-ROM 110 is set into the CD-ROM drive 108 to read out and download the program from the CD-ROM 108 into the HDD 107 through an internal bus 111. The machine-readable media may be composed of a magnetic disk or an optical disk other than the CD-ROM 110. The communication interface 109 is connected to other nodes 102 and 103 through the data bus 10 provided by means of a cable or in the form of LAN (Local Area Network), public telephone network and INTERNET.

The node machine can be implemented by the personal computer which is installed with the needed data and programs. In such a case, the data and programs are provided to the user by means of the machine-readable media such as the CD-ROM 110 or a floppy disk. The machine-readable media contains instructions for causing a network system to perform a method of transferring data by routing from primary node machines to secondary node machines through a plurality of channels. The method comprises the steps of automatically instituting one primary node for trying to secure an exclusive access to a default channel which is initially allotted to said one primary node when the same sets up the routing, alternatively instituting said one primary node for securing an access to a substitute channel when said one primary node fails to secure the exclusive access to the default channel due to conflict with another primary node which is allotted the same default channel, subsequently instituting said one primary node to circulate a message through the default channel to a secondary node to notify that said one primary node secures the substitute channel in place of the default channel, responsively instituting the secondary node to establish the routing between said one primary node and the secondary node upon receipt of the message circulated through the default channel so that the secondary node is ready to admit dada from said one primary node through the substitute channel, and routinely transferring data to the secondary node from said one primary node through the substitute channel once the routing is established.

Preferably, the primary nodes are designed to transmit data according to various protocols, and said one primary node and said another primary node incidentally adopt the same protocol and are therefore initially allotted the same default channel corresponding to the same protocol, thereby causing conflict with one another.

Preferably, the step of subsequently instituting comprises detecting when said another primary node succeeds in securing the exclusive access to the default channel, then transmitting the message to said another primary node through the default channel, and requesting said another primary node to pass the message to the secondary node through the default channel, whereby the secondary node recognizes that said one primary node secures the substitute channel according to the message circulated through the default channel.

Preferably, the step of responsively instituting comprises instituting the secondary node to reset initial setting of the default channel allotted thereto to the substitute channel according to the circulated message so as to allow the secondary node to exclusively admit the data transmitted from said one primary node through the substitute channel.

Preferably, the method further comprises the step of selectively trimming by manual operation the routing when the same is automatically established between a single of the primary nodes and a multiple of the secondary nodes so as to customize the routing.

Preferably, the method further comprises the step of manually establishing the routing among the secondary nodes in order to avoid an endless looping of the data which would occur if the routing is automatically established among the secondary nodes.

The present invention is not limited to the above-mentioned preferred embodiment. In the above-mentioned embodiment, only MIDI data and audio data are transferred among the nodes. It will be apparent that still picture data and moving picture data may also be transferred in the above-mentioned data transfer system. In the above-mentioned embodiment, the user manually performs channel setting for the secondary data rather than using automatic channel setting. It will be apparent that all channels may be set automatically while unnecessary channels may be disconnected by the user.

As described above, according to the invention, a predetermined standard channel or default channel corresponding to one of a plurality of data formats is allocated to an adequate node. If the allocation of the standard channel fails, a channel other than the standard channel is allocated as an substitute channel. When the substitute channel is allocated, the information about the substitute channel is transmitted over the standard channel, so that logical connection can be established easily in the data transfer system composed of nodes interconnected via a common data bus. This novel construction enhances the ease-of-use of the logically constituted system while making the most of the advantanges provided by the same.

As described above, according to the channel control method of the invention, a sending electronic apparatus normally secures a predetermined standard channel corresponding to one of a plurality of data formats that is used by the sending electronic apparatus. If the allocation of the standard channel fails, the sending electronic apparatus secures a channel other than the standard channel as an substitute channel. When the substitute channel is allocated, the sending electronic apparatus sends the information about the allocated substitute channel through the standard channel. On the other hand, a receiving electronic apparatus receives the information from the sending electronic apparatus. According to the received information, the receiving electronic apparatus makes setting so that data coming from the sending electronic apparatus can be received via the allocated substitute channel. This novel construction facilitates the logical connection in the data transfer system with a plurality of electronic apparatuses interconnected via a common data bus, thereby enhancing the ease-of-use of the logically constituted system while making the most of the advantages provided by the same.

While the preferred embodiment of the present invention has been described using specific terms, such description is for illustrative purposes only, and it is to be understood that changes and variations may be made without departing from the spirit or scope of the appended claims.

What is claimed is:

1. A system for transferring data by routing from primary nodes to secondary nodes through a plurality of channels, wherein one primary node comprises:

a setup device that automatically tries to secure an exclusive access to a default channel which is initially allotted to said one primary node when the same sets up the routing;

a backup device that alternatively secures an access to a substitute channel when the setup device fails to secure the exclusive access to the default channel due to conflict with another primary node which is allotted the same default channel, whereby said default channel remains active while said substitute channel is secured by said one primary node, thereby automatically resolving the conflict among said one primary node and said another primary node;

a routing device that circulates a message directed to a secondary node to notify thereto the substitute channel secured by said one primary node in place of the default channel and that consequently establishes the routing between said one primary node and the secondary node; and a transmitting device that routinely transfers data to the secondary node through the substitute channel after the secondary node recognizes that said one primary node secures the substitute channel for communication with the secondary node.

2. A system according to claim 1, wherein the primary nodes are designed to transmit data according to various protocols, and wherein said one primary node and said another primary node incidentally adopt the same protocol and are therefore initially allotted the same default channel corresponding to the same protocol, thereby causing conflict with one another.

3. A system according to claim 2, wherein the primary nodes are designed to transmit music data according to various protocols including Musical Instrument Digital Interface protocol and Pulse Code Modulation protocol to enable the secondary nodes to synthesize musical tones.

4. A system according to claim 1, wherein the routing device detects when said another primary node succeeds in securing the exclusive access to the default channel, then transmits the message to said another primary node through the default channel, and requests said another primary node to pass the message to the secondary node through the default channel, whereby the secondary node recognizes that said one primary node secures the substitute channel according to the message circulated through the default channel.

5. A system according to claim 1, wherein the secondary node comprises a reset device that resets initial setting of the default channel allotted thereto to the substitute channel according to the circulated message and that is consequently allowed to exclusively admit the data transmitted from said one primary node through the substitute channel.

6. A system according to claim 1, further comprising a trimming device that selectively trims by manual operation the routing when the same is automatically established between a single of the primary nodes and a multiple of the secondary nodes so as to customize the routing.

7. A system according to claim 1, further comprising a manual device that manually establishes the routing among the secondary nodes in order to avoid an endless looping of the data which would occur if the routing is automatically established among the secondary nodes.

8. A system for transferring data by routing from primary nodes to secondary nodes through a plurality of channels, wherein one primary node comprises:

setup means for automatically trying to secure an exclusive access to a default channel which is initially allotted to said one primary node when the same sets up- the routing;

backup means for alternatively securing an access to a substitute channel when the setup means fails to secure the exclusive access to the default channel due to conflict with another primary node which is allotted the same default channel, whereby said default channel remains active while said substitute channel is secured by said one primary node, thereby automatically resolving the conflict among said one primary node and said another primary node;

routing means for circulating a message directed to a secondary node to notify thereto the substitute channel secured by said one primary node in place of the default channel so as to establish the routing between said one primary node and the secondary node; and transmitting means for routinely transferring data to the secondary node through the substitute channel after the secondary node recognizes that said one primary node secures the substitute channel for communication with the secondary node.

9. A system according to claim 8, wherein the primary nodes are designed to transmit data according to various protocols, and wherein said one primary node and said another primary node incidentally adopt the same protocol and are therefore initially allotted the same default channel corresponding to the same protocol, thereby causing conflict with one another.

10. A system according to claim 8, wherein the routing means comprises means for detecting when said another primary node succeeds in securing the exclusive access to the default channel, means for transmitting the message to said another primary node through the default channel, and means for requesting said another primary node to pass the message to the secondary node through the default channel, so that the secondary node recognizes that said one primary node secures the substitute channel according to the message circulated through the default channel.

11. A method of transferring data by routing from primary nodes to secondary nodes through a plurality of channels, comprising the steps of:

automatically instituting one primary node for trying to secure an exclusive access to a default channel which is initially allotted to said one primary node when the same sets up the routing;

alternatively instituting said one primary node for securing an access to a substitute channel when said one primary node fails to secure the exclusive access to the default channel due to conflict with another primary node which is allotted the same default channel, whereby said default channel remains active while said substitute channel is secured by said one primary node, thereby automatically resolving the conflict among said one primary node and said another primary node;

subsequently instituting said one primary node to circulate a message through the default channel to a secondary node to notify that said one primary node secures the substitute channel in place of the default channel;

responsively instituting the secondary node to establish the routing between said one primary node and the secondary node upon receipt of the message circulated through the default channel so that the secondary node is ready to admit data from said one primary node through the substitute channel;

and routinely transferring data to the secondary node from said one primary node through the substitute channel once the routing is established.

12. A method according to claim 11, wherein the primary nodes are designed to transmit data according to various protocols, and wherein said one primary node and said another primary node incidentally adopt the same protocol and are therefore initially allotted the same default channel corresponding to the same protocol, thereby causing conflict with one another.

13. A method according to claim 11, wherein the step of subsequently instituting comprises detecting when said another primary node succeeds in securing the exclusive access to the default channel, then transmitting the message to said another primary node through the default channel, and requesting said another primary node to pass the message to the secondary node through the default channel, whereby the secondary node recognizes that said one primary node secures the substitute channel according to the message circulated through the default channel.

14. A method according to claim 11, wherein the step of responsively instituting comprises instituting the secondary node to reset initial setting of the default channel allotted thereto to the substitute channel according to the circulated message so as to allow the secondary node to exclusively admit the data transmitted from said one primary node through the substitute channel.

15. A method according to claim 11, further comprising the step of selectively trimming by manual operation the routing when the same is automatically established between a single of the primary nodes and a multiple of the secondary nodes so as to customize the routing.

16. A method according to claim 1, further comprising the step of manually establishing the routing among the secondary nodes in order to avoid an endless looping of the data which would occur if the routing is automatically established among the secondary nodes.

17. A machine-readable media containing instructions for causing a network system to perform a method of transferring data by routing from primary node machines to secondary node machines through a plurality of channels, the method comprising the steps of:

automatically instituting one primary node machine for trying to secure an exclusive access to a default channel which is initially allotted to said one primary node machine when the same sets up the routing;

alternatively instituting said one primary node machine for securing an access to a substitute channel when said one primary node machine fails to secure the exclusive access to the default channel due to conflict with another primary node machine which is allotted the same default channel, whereby said default channel remains active while said substitute channel is secured by said one primary node, thereby automatically resolving the conflict among said one primary node and said another primary node;

subsequently instituting said one primary node machine to circulate a message through the default channel to a secondary node machine to notify that said one primary node machine secures the substitute channel in place of the default channel;

responsively instituting the secondary node machine to establish the routing between said one primary node machine and the secondary node machine upon receipt of the message circulated through the default channel so that the secondary node machine is ready to admit data from said one primary node machine through the substitute channel; and routinely transferring data to the secondary node machine from said one primary node machine through the substitute channel once the routing is established.

18. A machine-readable media according to claim 17, wherein the primary node machines are designed to transmit data according to various protocols, and wherein said one primary node machine and said another primary node machine incidentally adopt the same protocol and are therefore initially allotted the same default channel corresponding to the same protocol, thereby causing conflict with one another.

19. A machine-readable media according to claim 17, wherein the step of subsequently instituting comprises detecting when said another primary node machine succeeds in securing the exclusive access to the default channel, then transmitting the message to said another primary node machine through the default channel, and requesting said another primary node machine to pass the message to the secondary node machine through the default channel, whereby the secondary node machine recognizes that said one primary node machine secures the substitute channel according to the message circulated through the default channel.

20. A machine-readable media according to claim 17, wherein the step of responsively instituting comprises instituting the secondary node machine to reset initial setting of the default channel allotted thereto to the substitute channel according to the circulated message so as to allow the secondary node machine to exclusively admit the data transmitted from said one primary node machine through the substitute channel.

21. A machine-readable media according to claim 17, wherein the method further comprises the step of selectively trimming by manual operation the routing when the same is automatically established between a single of the primary node machines and a multiple of the secondary node machines so as to customize the routing.

22. A machine-readable media according to claim 17, wherein the method further comprises the step of manually establishing the routing among the secondary node machines in order to avoid an endless looping of the data which would occur if the routing is automatically established among the secondary node machines.

23. A system for transferring data by routing from primary nodes to secondary nodes through a plurality of channels, wherein a secondary node comprises:

a setup device that automatically tries to secure an exclusive access to a default channel which is initially allotted to a corresponding primary node while the corresponding primary node alternatively secures an access to a substitute channel after failing to secure the exclusive access to the default channel due to conflict with another primary node which is allotted the same default channel;

a backup device that receives a message circulated from the corresponding primary node, the message indicating that the corresponding primary node secures the substitute channel in place of the default channel;

a reset device that resets initial setting of the default channel allotted thereto to the substitute channel according to the circulated message; and a receiving device that is consequently allowed to exclusively admit data transmitted from the corresponding primary node through the substitute channel, whereby said default channel remains active while said substitute channel is secured by said one primary node, thereby automatically resolving the conflict among said one primary node and said another primary node.

24. An electronic apparatus using a predetermined format for transferring data in a network system capable of circulating data in various formats among a plurality of electronic apparatuses through a plurality of channels, the electronic apparatus comprising:

a setup device operable to secure an access to a particular channel which corresponds to the predetermined format;

a backup device operable when the setup device fails to secure the access to the particular channel for automatically securing an access to a substitute channel selected from the plurality of the channels other than the particular channel; and a transmitting device that transmits data to the network system through either of the particular channels secured by the setup device or the substitute channel secured by the backup device.

25. The electronic apparatus according to claim 24, wherein the transmitting device operates when the backup device secures the access to the substitute channel for transmitting a message concerning the secured substitute channel to the network system.

26. A channel management apparatus for managing a plurality of communication channels prepared in a network system capable of circulating data in various formats among a plurality of nodes through the plurality of the communication channels, the channel management apparatus comprising:

a memory that memorizes whether each of the communication channels is available or not;

a receiving device that receives from one of the nodes involved in the network system a request for a transmission right of a desired communication channel to use for transmitting data; and a transmitting device that transmits back to said one node a response indicating whether the desired communication channel is available according to contents of the memory.

27. A system comprising a plurality of nodes including primary nodes and secondary nodes interconnected to each other via a serial data bus, for transmitting data by routing from primary nodes to secondary nodes through a plurality of channels logically established using the serial data bus, wherein one of the plurality of the nodes operates as a channel manager to control transmission rights of the plurality of the channels, wherein one primary node comprises a processor, a memory coupled to the processor adapted to store a program to be executed by the processor, and a communication interface coupled to the processor and connected to others of the plurality of the nodes through the serial data bus, wherein the processor operates in accordance with the program and automatically tries to secure an exclusive access to an initial channel which is initially allotted to said one primary node, and wherein if the channel manager does not give said one primary node a transmission right for the initial channel because the initial channel has been allotted to another primary node, the processor alternatively secures an access to a substitute channel, and routinely transfers data to at least one of the secondary nodes through the substitute channel after said one primary node receives a transmission right for the substitute channel from the channel manager.

28. A method of transferring data using a predetermined format from one node to another node in a network system capable of circulating data in various formats among a plurality of nodes through a plurality of channels, the method comprising the steps of:

initially securing an access to a particular channel which corresponds to the predetermined format;

alternatively securing an access to a substitute channel selected from the plurality of the channels other than the particular channel when the step of initially securing fails to secure the access to the particular channel; and transmitting data to the network system through either the particular channel secured by the step of initially securing or the substitute channel secured by the step of alternatively securing.

29. The method according to claim 28, further comprising the step of transmitting a message concerning the secured substitute channel to the network system when the step of alternatively securing secures the access to the substitute channel.

30. A method of managing a plurality of communication channels in a network system capable of circulating data in various formats among a plurality of nodes through the plurality of the communication channels, the method comprising the steps of:

memorizing states of the communication channels in the network system;

receiving from one of the nodes involved in the network system a request for a transmission right of a desired communication channel to use for transmitting data; and transmitting back to said one node a response indicating whether the desired communication channel is available according to the memorized state of the desired communication channel.

31. A method of transmitting data by routing from a primary node to a secondary node in a system comprised of a plurality of nodes including primary nodes and secondary nodes interconnected to each other through a plurality of channels logically established by using a serial data bus, the method comprising the steps of:

designating one of the plurality of the nodes for a channel manager to control transmission rights of the plurality of the channels; and operating one primary node comprised of a processor, a memory coupled to the processor adapted to store a program to be executed by the processor, and a communication interface coupled to the processor and connected to others of the plurality of the nodes through the serial data bus;

wherein the operating step further comprises:

operating the processor in accordance with the program for automatically trying to secure an exclusive access to an initial channel which is initially allotted to said one primary node;

operating the processor for alternatively securing an access to a substitute channel when the channel manager does not give said one primary node a transmission right for the initial channel because the initial channel has been allotted to another primary node; and routinely transferring data to at least one of the secondary nodes through the substitute channel after said one primary node receives a transmission right for the substitute channel from the channel manager.

32. A machine-readable media containing instructions for performing a method of transferring data using a predetermined format from one node to another node in a network system capable of circulating data in various formats among a plurality of nodes through a plurality of channels, the instructions being executable by a processor of said one node to perform the method comprising the steps of:

initially securing an access to a particular channel which corresponds to the predetermined format;

alternatively securing an access to a substitute channel selected from the plurality of the channels other than the particular channel when the step of initially securing fails to secure the access to the particular channel; and transmitting data to the network system through either the particular channel secured by the step of initially securing or the substitute channel secured by the step of alternatively securing.

33. The machine-readable media according to claim 32, wherein the method further comprises the step of transmitting a message concerning the secured substitute channel to the network system when the step of alternatively securing secures the access to the substitute channel.

34. A machine-readable media containing instructions executable by a processor of a channel manager for performing a method of managing a plurality of communication channels prepared in a network system capable of circulating data in various formats among a plurality of nodes through the plurality of the communication channels, wherein the method comprises the steps of:

memorizing states of the communication channels prepared in the network system;

receiving from one of the nodes involved in the network system a request for a transmission right of a desired communication channel to use for transmitting data; and transmitting back to said one node a response indicating whether the desired communication channel is available according to the memorized state of the desired communication channel.

35. A machine-readable media containing instructions for performing a method of transmitting data by routing from a primary node to a secondary node in a system comprised of a plurality of nodes including primary nodes and secondary nodes interconnected to each other through a plurality of channels logically established by using a serial data bus, the instructions being executed by a processor of one primary node to perform the method comprising the steps of:

communicating with a channel manager which is one of the plurality of the nodes designated to control transmission rights of the plurality of the channels;

automatically trying to secure an exclusive access to an initial channel which is initially allotted to said one primary node;

alternatively securing an access to a substitute channel when the channel manager does not give said one primary node a transmission right for the initial channel because the initial channel has been allotted to another primary node; and routinely transferring data to at least one of the secondary nodes through the substitute channel after said one primary node receives a transmission right for the substitute channel from the channel manager.

* * * * *